April 27, 1954  A. G. VANDERPOEL  2,676,577
WATER INJECTOR CARBURETION CONTROL SYSTEM
Filed April 7, 1951  2 Sheets-Sheet 1
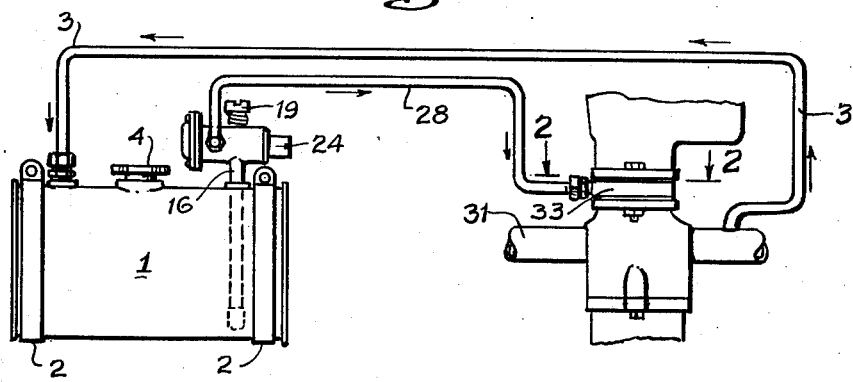
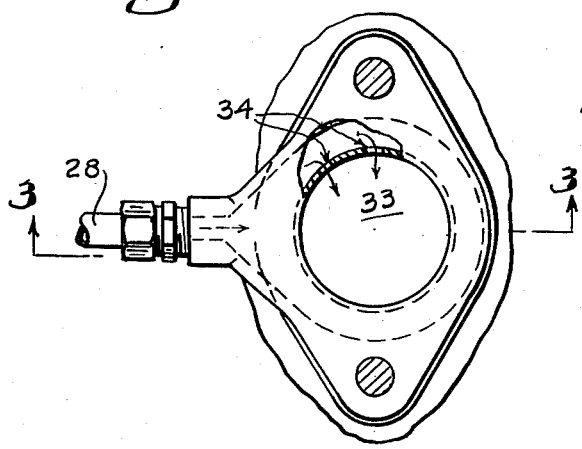
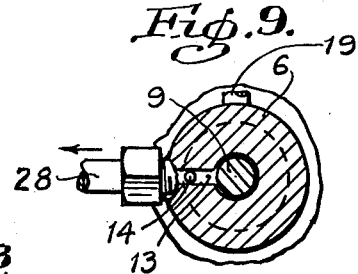
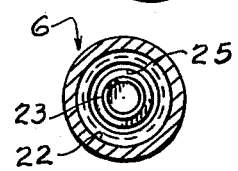
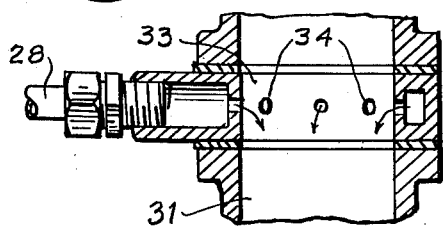
INVENTOR.
ALBERT G. VANDERPOEL
BY
ATTORNEY.

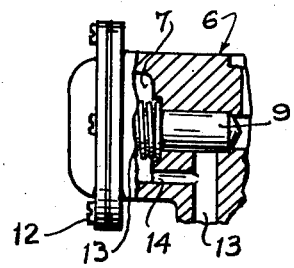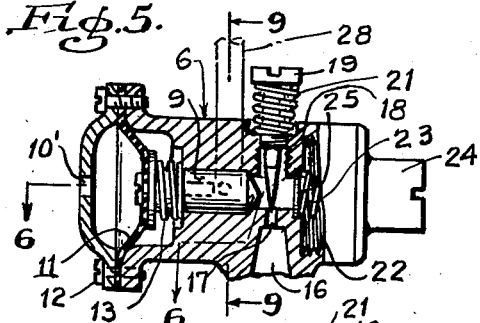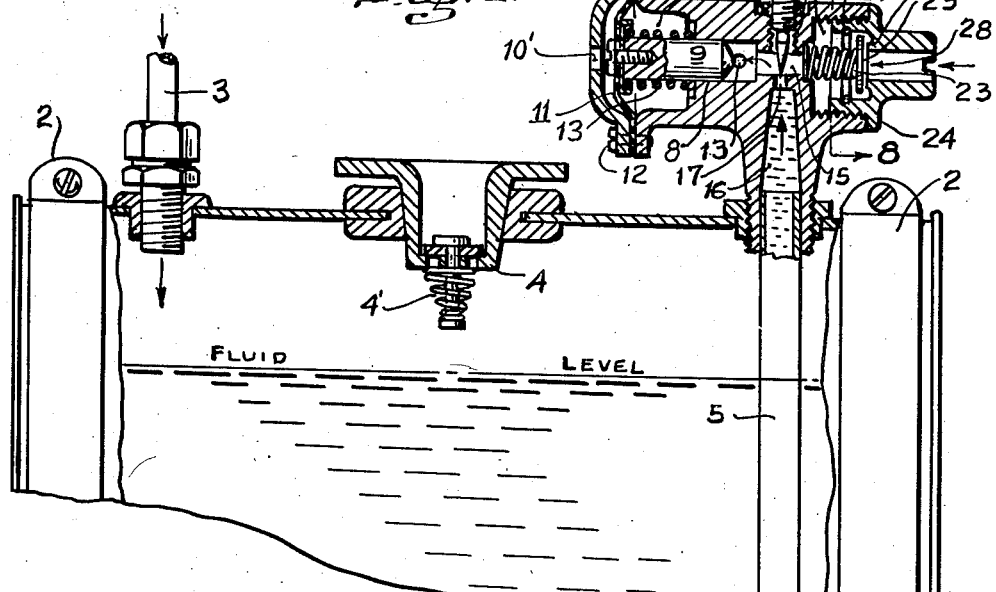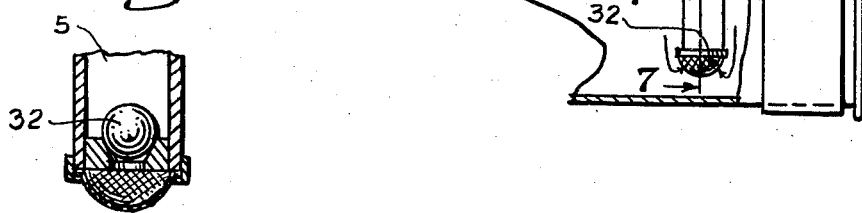

Patented Apr. 27, 1954

2,676,577

UNITED STATES PATENT OFFICE 2,676,577

WATER INJECTOR CARBURETION CONTROL SYSTEM

Albert G. Vanderpoel, Los Angeles, Calif., assignor of one-half to Fred J. Ellers, Burbank, Calif.

Application April 7, 1951, Serial No. 219,797

16 Claims. (Cl. 123—25)

This invention relates to devices for introduction of fluids into an air fuel induction system of an internal combustion engine.

It is particularly adapted to the introduction of auxiliary fuels or fuel additives in internal combustion engines and particularly in spark ignition internal combustion engines.

As is well known in such engines the permissible spark advance is a function not only of engine speed but also of load. This may be accomplished by adjusting the spark advance at different speeds and loads. Devices for this purpose to automatically adjust the spark advance are now common. An example of such devices is the Vanderpoel-Ostling Patent No. 2,249,446.

The prevention of detonation at any load and engine speed by retardation of the spark, however, has the disadvantage of sacrificing efficiency. The alternative of increasing the octane rating of the fuel so that detonation is suppressed even with an advanced spark setting is also common. Thus fuels fortified with anti-knock additives are common. However, the octane demand of the engine varies with load and engine speed and the addition of the anti-knock material to the fuel requires that the fuel be tailored for the severest octane demand of the operating cycle. Since for all other conditions the octane rating of the fuel will be in excess of that required, this constitutes an economic waste.

I have devised a mechanism which adjusts the amount of anti-knock additive added to the fuel to correspond to the knock suppression demand of the operating cycle. Thus I may add more or less anti-knock material as the octane demand of the operating cycle is more or less.

Illustrating the purpose and function of my invention, at idling conditions where detonating conditions are of minor importance, my device holds the fuel additive flow to a minimum or may, if desired, prevent such addition. At road or full load conditions with part open throttle and with increasing speed, the addition of the fuel is increased proportionately to engine speed.

In the specific embodiment of my invention described below, the introduction of the fuel additive is made under the influence of manifold vacuum. However, under full load, wide-open throttle conditions, the manifold vacuum is very low. I have devised means whereby the feed then is made under the influence of exhaust manifold pressure. Since this is also proportional to engine speed, the addition of the additive is thus also made proportional to engine speed and octane demand at full open throttle.

It is to be noted also that since fuel demand is also proportional to engine speed my device will feed the fuel additive proportionately to the fuel flow to the engine.

In order to accomplish these results, I have provided a tank in which the liquid fuel additive may be stored. This tank is connected to the exhaust manifold so that exhaust manifold pressure may be exerted over the liquid. A liquid outlet is provided which is controlled by a valve which is responsive to the intake manifold pressure in such manner that the valve is closed when the exhaust manifold vacuum is extremely high as under cranking or idling conditions. The valve is open when the throttle is partly opened as, for example, under road load conditions, to cause the liquid to flow under the difference in absolute pressure existing between super-atmospheric exhaust and intake sub-atmospheric pressures. The valve will remain open during the low vacuum conditions in the intake manifold when the throttle is opened wide to cause the liquid to flow under the exhaust manifold pressure. The valve also functions to close and thus stop the fuel additive flow when the engine is stopped.

This system may be applied to the introduction of various liquids into the intake manifold. Thus, for example, I may introduce a fuel of different octane characteristics or an anti-knock additive. For example, I may introduce a fuel of high concentration anti-knock material such as tetraethyl lead, or I may introduce benzol or alcohol or a mixture of alcohol and water, or water.

This invention will be further described by reference to the drawing, in which

Fig. 1 shows the relationship of vacuum injection mechanism to the carburetor of an intake of an internal combustion engine;

Fig. 2 is a section taken along line 2—2 of Fig. 1;

Fig. 3 is a section taken along line 3—3 of Fig. 2;

Fig. 4 is a vertical section with parts broken away of the tank and flow control mechanism;

Fig. 5 is a detail of Fig. 4, showing the valve in closed position;

Fig. 6 is a section taken along line 6—6 of Fig. 5;

Fig. 7 is a section taken along line 7—7 of Fig. 4;

Fig. 8 is a section taken along line 8—8 of Fig. 4; and

Fig. 9 is a section taken along line 9—9 of Fig. 4.

The tank for containing the auxiliary fluid for injection, such as water or water and alcohol or anti-knock fluid, is shown at 1, and may be suitably positioned anywhere upon the internal combustion engine or the vehicle powered by such engine, and may be mounted by suitable straps 2 or by any other desired means.

An inlet pipe 3 is connected to the tank by suitable flanges or bushings. The tank carries a check valve 4 spring-loaded by a spring 4'. An outlet pipe 5 is mounted in the tank and is positioned to extend to near the bottom of the tank and extends through the top, and has mounted thereupon a valve 6 to be described hereinafter. It will be understood that all the tube mountings are made air-tight so that the tank may be hermetically sealed and subjected to pressure, as will be described hereinafter.

The valve 6 is chambered at one end thereof to provide a diaphragm chamber 7 which carries an axially disposed central bore 8. Positioned in the diaphragm chamber 7 and in the bore 8 is a piston valve 9. The piston valve 9 makes a fluid-tight and sliding fit in the bore 8. The piston valve 9 is connected to the diaphragm 11. Between the diaphragm 11 and the base of the chamber 7 is positioned the compression spring 12. The diaphragm 11 is sealed at its edges between the flanges of the valve body and the cover 10 and held by bolts 12. The cover 10 carries a bore 10' so that the chamber 7 is vented to atmosphere on the side of the diaphragm opposite the valve 9. As will be observed this construction provides a valve 9 movable in the chamber 8 under response to the difference between atmospheric and the pressure existing in the chamber 7, biased by the tension of the spring 12.

The bore 8 is connected via transverse bore 13 to pipe 28 and via conduit 14 to the chamber 7. The pipe 28 is connected to the carburetor as will be further described. The bore 8 is connected by an axially disposed conduit 15 to the chamber 22 formed in the end of the valve body opposite to the chamber 7. The conical conduit 16 to which the pipe 5 is connected intercepts the conduit 15 through a port 17. The needle valve 19 is positioned in a bore 18 positioned in an axial extension of the port 17. The needle valve is screwed into the bore 18 against the spring 21 so that the point 20 of the valve enters and closes the port 17.

Positioned in the chamber 22 is a fitting 24 having a port 28 which is closed by a plate 25 positioned in the chamber 22 and movable between the face 26 of the port 28 and a limit motion ring 27. The plate 25 is held against the face 26 by a spring 23.

A check valve 32 is positioned in the end of the tube 5. Pipe 3 is connected to the exhaust manifold 31 of the internal combustion engine. The line 2 is connected to a hollow annular fitting 32 positioned in the air fuel intake manifold 33, between the throttle and the engine. The ports 34 in the walls of the fitting provide a communication between the intake manifold 33 and the port 13 by means of the pipe 35.

The operation of the system is as follows:

With the engine operating, the exhaust manifold 31 is under pressure and the pressure is communicated to the chamber above the fluid positioned in the tank 1. Pressure is thus exerted via pipe 3 over the liquid in the tank which pressure will continue during the operation of the engine so long as fluid is present. If the pressure gets excessive, the pressure overcomes the spring 4', and the pressure may be vented through the check valve 4. Thus a controlled and moderate pressure of the desired magnitude, depending upon the tension of the spring 4', is maintained in the tank.

With the engine operating a low pressure (i. e., high vacuum) in the air fuel conduit 33 is exerted through the ports 34, line 28 to the port 13, bore 8 and via the cross bore 14 to the diaphragm chamber 7. During the period of operation such as during cranking or idling, the vacuum in the air fuel line 33 is sufficient so that the tension in the spring 12 is overcome by the difference in pressure across the diaphragm and the valve 9 is in closed position as shown in Fig. 5. The low exhaust manifold pressure which is exerted through line 2 during idling or cranking is insufficient to force the liquid through line 5 and to displace the valve 9 from the position shown in Fig. 5, i. e., the closed position, to the position shown in Fig. 4. Consequently no fuel additive from tank 2 is thus introduced. However, the fluid pressure and the spring 23 will hold the plate 25 against the face of the port 28 to seal the port.

When the engine is accelerated by partly opening the throttle or during operation at road load conditions, the pressure in the line 33 rises, vacuum decreases, the differential pressure across the diaphragm decreases, and the spring 12 slowly moves the piston 9 to the left to slowly uncover the port 13 as shown in Fig. 4. With the needle valve suitably positioned to open or partly open port 17, the pipe 5 is thus under the influence of the vacuum in port 13 and the pressure in tank 1. The check valve 32 is thus unseated and the liquid in line 5 flows through conduit 16 through port 17 and through port 13 in through line 28 and the nozzles 34 into the air fuel stream. The fluid pressure and the spring 23 are sufficient at this point to hold the plate 25 against the face of the port 28 to seal the port.

It will be observed that the pressure differential between the manifold pressure exerted over the fluid in the tank 1 and the vacuum present in 33 is high at this point and this pressure difference is substantially proportional to the engine speed at constant throttle opening, since both the exhaust manifold pressure and the intake manifold vacuum are so proportional to engine speed. Since the rate of fuel injection is also proportional to engine speed at any given load and throttle position, it will be observed that the ratio of volume of liquid added from tank 1 to fuel may be held at a desired ratio by the setting of the needle valve 19.

It is thus possible to have an automatic proportioning of the liquid in tank 1 to the rate of fuel flow. The variation in exhaust manifold pressure is small over the entire range of engine speeds at part throttle operation in comparison with the variation in intake manifold vacuum over such range of speeds at such part throttle operation. The rate of flow of the liquid is thus, for all practical purposes, responsive to the variation in intake manifold vacuum at part throttle operation and may be said to be responsive to such vacuum.

When the throttle is opened wide as, for example, under lugging conditions at high load or acceleration or hill climbing, the vacuum in the intake manifold, that is, in line 33, drops rapidly and with wide open throttle may be substantially atmospheric. Pressure in chamber 7 thus rises to substantially atmospheric. In such case the spring 12 holds the valve 9 in open position and the flow of the fluid through 5 is under the influence of the manifold pressure exerted through 3 in the tank 1. Since the fuel demand is thus proportional to engine speed and since the manifold pressure is also proportional to engine speed under such conditions, the rate of flow of the fluid through 5 is thus also proportional to engine speed.

The pressure in the intake manifold is now substantially atmospheric and since the pressure in the tank 1 above the fluid is now above atmospheric and is exerted through line 5 into the conduit 15, the plate 25 is seated against the face 26 to close the conduit 28. Under these conditions fluid flow through line 5 into line 28 is under positive exhaust pressure and pressure injection occurs, the pressure in port 15, line 23, and port 13 being superatmospheric and under the influence of exhaust manifold pressure.

When the throttle is then moved to part closed position, vacuum is again generated in the conduit 28 and through port 13 and in diaphragm chamber 7, but insufficiently to overcome the spring 12 which holds valve 9 in open position. Atmospheric pressure moves the plate 28 from the face 26 to momentarily drop the pressure in the port 15 to atmospheric, thus preventing syphoning of the fluid from the tank 1 into line 28. When this occurs the spring again seats the plate 25 against the face of the port 28 and vacuum feed is resumed. When this vacuum is sufficient to establish a sub-atmospheric pressure in 15, sufficient to overcome the spring 23, the plate 25 is again moved from the face of the port 28, thus venting the pressure. The spring 23 and the plate 25 thus limit the degree of vacuum in the port 15 to prevent excessive flow of fluid. This operation occurs throughout the period of vacuum feed. If the engine is shut off, vacuum no longer is exerted in line 28 and through port 13. The spring 12 moves the valve plunger 9 into open position as shown in Fig. 4 since when the engine is shut off the manifold vacuum drops to atmospheric. The pressure in tank 1 also drops to atmospheric, because the exhaust manifold pressure has thus dropped to atmospheric. The vacuum in line 15 is vented to atmospheric because the valve 28 unseats as the result of atmospheric pressure exerted through the port 25 and therefore no syphoning of the fluid from tank 1 can occur.

While I have described a particular embodiment of my invention for the purpose of illustration, it should be understood that various modifications and adaptations thereof may be made within the spirit of the invention as set forth in the appended claims.

I claim:

1. An apparatus for injection of liquid into the air fuel intake system of an internal combustion engine, comprising a tank adapted to contain liquid, a gas inlet line connected to the gas space of said tank and adapted for connection to the exhaust manifold of said engine, a liquid outlet pipe from said tank, said pipe being adapted for connection to the air fuel induction line of an internal combustion engine, a valve in said line, a vacuum operated means connected to said line and to said valve to actuate said valve, and a syphon break check valve connected to said liquid outlet line.

2. A device for injection of a liquid into the air fuel induction line of an internal combustion engine, comprising a tank adapted to contain liquid, a gas inlet line connected to the gas space of said tank and adapted for connection to the exhaust manifold of the internal combustion engine, a liquid outlet line, a valve in said outlet line comprising a valve casing, a diaphragm chamber, a diaphragm in said diaphragm chamber, said chamber on one side of the diaphragm being vented to atmosphere, the diaphragm chamber on the other side of the diaphragm being connected to said outlet line, a spring loaded valve member connected to said diaphragm chamber and adapted to close said line, and a pressure communication between said diaphragm chamber on said other side of said diaphragm and said line.

3. A device for injection of a liquid into the air fuel intake line of an internal combustion engine, comprising a tank adapted to contain liquid, a gas inlet line connected to the gas space of said tank and adapted for connection to the exhaust manifold of the internal combustion engine, a liquid outlet line, a valve comprising a valve casing, a diaphragm chamber, a diaphragm in said diaphragm chamber, said chamber on one side of the diaphragm being vented to atmosphere, the diaphragm chamber on the other side of the diaphragm being connected to said liquid outlet line, a spring loaded valve member connected to said diaphragm chamber and adapted to close said liquid outlet line, a pressure communication between said diaphragm on said other side of said diaphragm and said liquid outlet line, an air vent connected to said line between said valve and said tank, and a check valve in said air vent.

4. An apparatus for injection of liquid into the air fuel intake line of an internal combustion engine, comprising an internal combustion engine including an air fuel intake line, a throttle in said line, a liquid injection nozzle in said line, an exhaust manifold, an auxiliary tank adapted to contain liquid, a pipe connected to the exhaust manifold and the gas space of the said tank, a liquid outlet line connected to the liquid space of said tank and said nozzle, a valve in said liquid outlet line between said liquid outlet from said tank and said nozzle, vacuum operative means operative upon the attainment of vacuum in said air fuel intake line upon part open throttle to open said valve, said operative means responsive to atmospheric pressure in said air fuel induction line to close said valve, and means including said exhaust manifold and said pipe connected to said exhaust manifold and said tank and operative at wide open throttle for forcing liquid through said liquid outlet line under pressure to maintain said valve in open position.

5. A liquid injection system for an internal combustion engine, comprising a tank, a gas inlet to said tank, a liquid outlet pipe from said tank, a valve in said pipe, said valve comprising a cylindrical conduit, a cross bore connected to said conduit, one end of said cross bore connected to said liquid outlet pipe, the other end of said cross bore being adapted for connection to the air fuel intake line of an internal combustion engine, a plug in said conduit to close said cross bore, a diaphragm chamber connected to said conduit, a diaphragm closing one end of said chamber, the other side of said diaphragm being vented to atmosphere, a fluid by-pass connection between said line and said diaphragm chamber, and a mechanical connection between said diaphragm and said plug.

6. A liquid injection system for an internal combustion engine, comprising a tank, a gas inlet to said tank, a liquid outlet pipe from said tank, a valve in said pipe, said valve comprising a cylindrical conduit, a cross bore connected to said conduit, one end of said cross bore connected to said liquid outlet pipe, the other end of said cross bore being adapted for connection to the air fuel intake line of an internal combustion engine, a plug in said conduit to close said cross bore, a diaphragm chamber connected to said conduit, a diaphragm closing one end of said chamber, the other side of said diaphragm being vented to atmosphere, a fluid by-pass connection between said line and said diaphragm chamber, a mechanical connection between said diaphragm and said plug, a second conduit in axial extension of said first named conduit, an air vent connected to said second conduit, and a check valve in said air vent.

7. A liquid injection system for an internal combustion engine, comprising a tank, a gas inlet to said tank, a liquid outlet pipe from said tank, a valve in said pipe, said valve comprising a cylindrical conduit, a cross bore connected to said conduit, one end of said cross bore connected to said liquid outlet pipe, the other end of said cross bore being adapted for connection to the air fuel intake line of an internal combustion engine, a plug in said conduit to close said cross bore, a diaphragm chamber connected to said conduit, a diaphragm closing one end of said chamber, the other side of said diaphragm being vented to atmosphere, a fluid by-pass connection between said line and said diaphragm chamber, a mechanical connection between said diaphragm and said plug, and a manual operative valve in said line between said liquid outlet and said cross bore.

8. A liquid injection system for an internal combustion engine, comprising a tank, a gas inlet to said tank, a liquid outlet pipe from said tank, a valve in said pipe, said valve comprising a cylindrical conduit, a cross bore connected to said conduit, one end of said cross bore connected to said liquid outlet pipe, the other end of said cross bore being adapted for connection to the air fuel intake line of an internal combustion engine, a plug in said conduit to close said cross bore, a diaphragm chamber connected to said conduit, a diaphragm closing one end of said chamber, the other side of said diaphragm being vented to atmosphere, a fluid by-pass connection between said line and said diaphragm chamber, a mechanical connection between said diaphragm and said plug, a second conduit in axial extension of said first named conduit, an air vent connected to said second conduit, a check valve in said air vent, and a manual operative valve in said line between said liquid outlet and said cross bore.

9. An apparatus for injection of liquid into an air fuel induction system of an internal combustion engine, comprising a tank adapted to contain liquid, a liquid outlet from said tank, means for flowing liquid from said tank proportionate to engine speed, a pipe connected to said outlet, a valve in said pipe, an inlet passageway to said valve connected to said pipe, an outlet passageway from said valve, a conduit connecting said outlet passageway to said induction system, said passageway being open at all engine speeds during operation of said engine, means to actuate said valve to cut off flow of fluid from said inlet to said outlet passageway, said actuating means comprising a means responsive to vacuum in said air-fuel induction system to actuate said valve.

10. An apparatus for injection of liquid into an air fuel induction system of an internal combustion engine, comprising a tank adapted to contain liquid, a gas inlet line connected to the gas space of said tank and adapted for connection to the exhaust manifold of the engine, a pipe outlet from said tank, means for flowing liquid from said tank through said line proportionate to engine speed comprising a valve, an inlet passageway to said valve, an outlet passageway from said valve, said pipe being connected to said inlet passageway, a conduit connecting said valve to said induction system, said inlet passageway being open at all engine speeds during operation of said engine, means to actuate said valve to cut off flow of fluid from said inlet to said outlet passageway, said actuating means comprising a means responsive to vacuum in said air-fuel induction system to actuate said valve.

11. An apparatus for injection of liquid into an air fuel induction system of an internal combustion engine, comprising a tank adapted to contain liquid, a liquid outlet from said tank, means for flowing liquid from said tank proportionate to engine speed, a pipe connected to said outlet, a valve in said pipe, an inlet passageway to said valve connected to said pipe, an outlet passageway from said valve, a conduit connecting said outlet passageway to said induction system, said passageway being open at all engine speeds during operation of said engine, means to actuate said valve to cut off flow of fluid from said inlet to said outlet passageway, said actuating means comprising a means responsive to vacuum in said air-fuel induction system to actuate said valve, and a manually operated valve between said tank and said inlet passageway.

12. An apparatus for injection of liquid into an air fuel induction system of an internal combustion engine, comprising a tank adapted to contain liquid, a liquid outlet from said tank, means for flowing liquid from said tank proportionate to engine speed, a pipe connected to said outlet, a valve in said pipe, an inlet passageway to said valve connected to said pipe, an outlet passageway from said valve, a conduit connecting said outlet passageway to said induction system, said passageway being open at all engine speeds during operation of said engine, means to actuate said valve to cut off flow of fluid from said inlet to said outlet passageway, said actuating means comprising a means responsive to vacuum in said air-fuel induction system to actuate said valve, a check valve in said conduit connected to said tank, said check valve being positioned between said tank and said first mentioned valve.

13. An apparatus for injection of liquid into an air fuel induction system of an internal combustion engine, comprising a tank adapted to contain liquid, a liquid outlet from said tank, means for flowing liquid from said tank proportionate to engine speed, a pipe connected to said outlet, a valve in said pipe, an inlet passageway to said valve connected to said pipe, an outlet passageway from said valve, a conduit connecting said outlet passageway to said induction system, said passageway being open at all engine speeds during operation of said engine, means to actuate said valve to cut off flow of fluid from said inlet to said outlet passageway, said actuating means comprising a means responsive to vacuum in said air-fuel induction system to actuate said valve, a manually operated valve between said tank and said inlet passageway, a check valve in said conduit connected to said tank, said check valve being positioned between said tank and said first mentioned valve.

14. An apparatus for injection of liquid into an air fuel induction system of an internal combustion engine, comprising a tank adapted to contain liquid, a gas inlet line connected to the gas space of said tank and adapted for connection to the exhaust manifold of the engine, a pipe outlet from said tank, means for flowing liquid from said tank through said line proportionate to engine speed comprising a valve, an inlet passageway to said valve, an outlet passageway from said valve, said pipe being connected to said inlet passageway, a conduit connecting said valve to said induction system, said inlet passageway being open at all engine speeds during operation of said engine, means to actuate said valve to cut off flow of fluid from said inlet to said outlet passageway, said actuating means comprising a means responsive to vacuum in said air-fuel induction system to actuate said valve, and a manually operated valve between said tank and said inlet passageway.

15. An apparatus for injection of liquid into an air fuel induction system of an internal combustion engine, comprising a tank adapted to contain liquid, a gas inlet line connected to the gas space of said tank and adapted for connection to the exhaust manifold of the engine, a pipe outlet from said tank, means for flowing liquid from said tank through said line proportionate to engine speed comprising a valve, an inlet passageway to said valve, an outlet passageway from said valve, said pipe being connected to said inlet passageway, a conduit connecting said valve to said induction system, said inlet passageway being open at all engine speeds during operation of said engine, means to actuate said valve to cut off flow of fluid from said inlet to said outlet passageway, said actuating means comprising a means responsive to vacuum in said air-fuel induction system to actuate said valve, and a check valve in said conduit connected to said tank, said check valve being positioned between said tank and said first mentioned valve.

16. An apparatus for injection of liquid into an air fuel induction system of an internal combustion engine, comprising a tank adapted to contain liquid, a gas inlet line connected to the gas space of said tank and adapted for connection to the exhaust manifold of the engine, a pipe outlet from said tank, means for flowing liquid from said tank through said line proportionate to engine speed comprising a valve, an inlet passageway to said valve, an outlet passageway from said valve, said pipe being connected to said inlet passageway, a conduit connecting said valve to said induction system, said inlet passageway being open at all engine speeds during operation of said engine, means to actuate said valve to cut off flow of fluid from said inlet to said outlet passageway, said actuating means comprising a means responsive to vacuum in said air-fuel induction system to actuate said valve, a manually operated valve between said tank and said inlet passageway, a check valve in said conduit connected to said tank, said check valve being positioned between said tank and said first mentioned valve.

References Cited in the file of this patent

UNITED STATES PATENTS

| Number | Name | Date |
| --- | --- | --- |
| 1,211,665 | Block | Jan. 9, 1917 |
| 2,445,479 | Francis | July 20, 1948 |
| 2,507,596 | Hodgkins | May 16, 1950 |